United States Patent
Ko

(10) Patent No.: US 11,582,762 B2
(45) Date of Patent: Feb. 14, 2023

(54) METHOD AND DEVICE FOR TRANSMITTING COMBINED SIGNAL GENERATED BASED ON DETERMINING A COMBINED WEIGHT

(71) Applicant: Samsung Electronics Co., Ltd., Suwon-si (KR)

(72) Inventor: Jaeyun Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 16/957,558

(22) PCT Filed: Jan. 18, 2019

(86) PCT No.: PCT/KR2019/000743
§ 371 (c)(1),
(2) Date: Jun. 24, 2020

(87) PCT Pub. No.: WO2019/143168
PCT Pub. Date: Jul. 25, 2019

(65) Prior Publication Data
US 2020/0329478 A1 Oct. 15, 2020

(30) Foreign Application Priority Data
Jan. 19, 2018 (KR) .......... 10-2018-0007290

(51) Int. Cl.
*H04W 72/06* (2009.01)
*H04L 5/00* (2006.01)
*H04W 74/08* (2009.01)

(52) U.S. Cl.
CPC .......... *H04W 72/06* (2013.01); *H04L 5/0048* (2013.01); *H04W 74/0833* (2013.01)

(58) Field of Classification Search
CPC .............. H04W 72/06; H04W 74/0833; H04L 5/0048; H04B 7/0865; H04B 7/086; H04B 7/0842; H04B 7/2609
See application file for complete search history.

(56) References Cited

U.S. PATENT DOCUMENTS

9,231,676 B2   1/2016   Zirwas et al.
9,351,156 B2   5/2016   Alex et al.
(Continued)

FOREIGN PATENT DOCUMENTS

EP      3 448 080 A1       2/2019
KR      10-2012-0002875 A  1/2012
(Continued)

OTHER PUBLICATIONS

European Search Report dated Dec. 1, 2020, issued in European Application No. 19740909.7.
(Continued)

*Primary Examiner* — Justin T Van Roie
(74) *Attorney, Agent, or Firm* — Jefferson IP Law, LLP

(57) ABSTRACT

Provided are a method and device for transmitting and receiving a signal in a wireless communication system. In a wireless communication system according to an embodiment of the present disclosure, a radio unit (RU) is configured to obtain channel information about a plurality of reception paths of the RU, through which signals of at least one user equipment (UE) are received, with respect to each UE, determine a combined weight based on the channel information by using preset mapping information according to the number of the plurality of reception paths and the number of combined paths that are combined from the plurality of reception paths, and transmit a combined signal to a digital unit (DU) through the combined paths, the combined signal being generated as a result of combining
(Continued)

the signals received through the plurality of reception paths according to the determined combined weight.

13 Claims, 7 Drawing Sheets

(56) References Cited

U.S. PATENT DOCUMENTS

| | | |
|---|---|---|
| 9,407,337 B2 | 8/2016 | Jalloul et al. |
| 9,455,816 B2 | 9/2016 | Ashikhmin |
| 9,503,164 B1 | 11/2016 | Zhang et al. |
| 9,608,701 B2 | 3/2017 | Kim |
| 9,647,736 B1 | 5/2017 | Schelstraete |
| 9,654,188 B2 | 5/2017 | Nieman |
| 9,762,301 B2 | 9/2017 | Kim et al. |
| 2011/0268037 A1 | 11/2011 | Fujimoto |
| 2013/0044028 A1 | 2/2013 | Lea et al. |
| 2013/0107849 A1 | 5/2013 | Park |
| 2013/0142270 A1 | 6/2013 | Stirling-Gallacher |
| 2014/0198829 A1 | 7/2014 | Egnell et al. |
| 2015/0139112 A1 | 5/2015 | Park et al. |
| 2015/0256241 A1 | 9/2015 | Jia et al. |
| 2015/0326286 A1 | 11/2015 | Wong et al. |
| 2016/0164593 A1 | 6/2016 | Lee et al. |
| 2016/0173252 A1 | 6/2016 | Lee et al. |
| 2016/0308589 A1 | 10/2016 | Jalloul et al. |
| 2017/0012681 A1 | 1/2017 | Buliga et al. |
| 2017/0019154 A1 | 1/2017 | Reed |
| 2017/0134073 A1 | 5/2017 | Babaei et al. |
| 2017/0238318 A1 | 8/2017 | Lemson et al. |
| 2017/0264347 A1 | 9/2017 | Le-Ngoc |
| 2017/0302342 A1 | 10/2017 | Kurchuk |

FOREIGN PATENT DOCUMENTS

| | | |
|---|---|---|
| KR | 10-1382420 B1 | 4/2014 |
| KR | 10-2015-0094916 A | 8/2015 |
| WO | 2016/198127 A1 | 12/2016 |
| WO | 2017/183284 A1 | 10/2017 |

OTHER PUBLICATIONS

Korean Office Action dated May 12, 2021, issued in Korean Application No. 10-2018-0007290.
International Search Report dated Apr. 25, 2019, issued in International Application No. PCT/KR2019/000743.

FIG. 5

$$W = \begin{bmatrix} h'(1,1) & 0 & \cdots & 0 \\ 0 & h'(1,2) & \cdots & 0 \\ \vdots & \vdots & \ddots & \vdots \\ 0 & 0 & \cdots & h'(1,m(1)) \\ & & \vdots & \\ h'(L,1) & 0 & \cdots & 0 \\ 0 & h'(L,2) & \cdots & 0 \\ \vdots & \vdots & \ddots & \vdots \\ 0 & 0 & \cdots & h'(L,m(L)) \end{bmatrix} \begin{matrix} \Big\} \text{GROUP 1 (510)} \\ \\ \Big\} \text{GROUP L (520)} \end{matrix}$$

|  | 32 RECEPTION PATHS | 610 |
|---|---|---|
| 8 COMBINED PATHS | h'(1) | 0 |
| | 0 | h'(1) |
| | h'(2) | 0 |
| | h'(1) | h'(2) |
| | h'(3) | 0 |
| | 0 | h'(3) |
| | h'(4) | 0 |
| | 0 | h'(4) |

METHOD AND DEVICE FOR TRANSMITTING COMBINED SIGNAL GENERATED BASED ON DETERMINING A COMBINED WEIGHT

TECHNICAL FIELD

The present disclosure relates to a wireless communication system, and more particularly, to a method and device for transmitting and receiving a signal in a wireless communication system.

BACKGROUND ART

To meet the increase in demand with respect to wireless data traffic after the commercialization of $4^{th}$ Generation (4G) communication systems, considerable efforts have been made to develop improved $5^{th}$ Generation (5G) communication systems or pre-5G communication systems. For this reason, 5G communication systems or pre-5G communication systems are called beyond 4G network communication systems or post Long Term Evolution (LTE) systems. To achieve a high data rate, the implementation of 5G communication systems in an ultra-high frequency millimeter wave (mmWave) band (e.g., a 60 GHz band) is under consideration. To alleviate propagation path loss of radio waves and increase propagation distances of radio waves in an ultra-high frequency band, technologies for 5G communication systems, such as beamforming, massive multiple input multiple output (MIMO), full dimensional MIMO (FD-MIMO), array antenna, analog beamforming, and large-scale antenna technologies are discussed. Also, in order to improve a system network for 5G communication systems, the development of techniques, such as evolved small cell, advanced small cell, cloud radio access network (cloud RAN), ultra-dense network, Device-to-Device (D2D) communication, wireless backhaul, moving network, cooperative communication, Coordinated Multi-Points (CoMP), and reception interference cancellation, has been conducted. In addition, for 5G communication systems, hybrid Frequency Shift Keying (FSK) and Quadrature Amplitude Modulation (QAM) (FQAM) and Sliding Window Superposition Coding (SWSC), which are Advanced Coding Modulation (ACM) schemes; and Filter Bank Multi-Carrier (FBMC), Non-Orthogonal Multiple Access (NOMA), and Sparse Code Multiple Access (SCMA), which are advanced access techniques, have been developed.

The Internet has evolved from a human-centered connection network, through which a human generates and consumes information, to an Internet of Things (IoT) network that exchanges and processes information between distributed elements such as objects. Internet of Everything (IoE) technology is emerging, in which technology related to the IoT is combined with, for example, technology for processing big data through connection with a cloud server. In order to implement the IoT, various technical components are required, such as a sensing technique, wired/wireless communication and network infrastructures, a service interfacing technique, a security technique, etc. In recent years, techniques including a sensor network for connecting objects, Machine-to-Machine (M2M) communication, Machine Type Communication (MTC), etc., have been studied. In the IoT environment, intelligent Internet Technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technology including beamforming, MIMO, array antennas, etc. The application of cloud RAN as the big data processing technique described above may be an example of convergence of 5G communication technology and IoT technology.

As it is possible to provide various services according to the development of wireless communication systems, there is a need for a method of efficiently providing these services.

DESCRIPTION OF EMBODIMENTS

Technical Problem

The present disclosure provides a method and device for transmitting and receiving a signal in a wireless communication system in which a radio unit and a digital unit are present at different positions, wherein resources required to transmit a signal from the radio unit to the digital unit may be effectively reduced through path combination.

Solution to Problem

The present disclosure relates to a method and device for transmitting and receiving a signal in a wireless communication system. In a wireless communication system according to an embodiment of the present disclosure, a radio unit (RU) is configured to obtain channel information about a plurality of reception paths of the RU, through which signals of at least one user equipment (UE) are received, with respect to each UE, determine a combined weight based on the channel information by using preset mapping information according to the number of the plurality of reception paths and the number of combined paths that are combined from the plurality of reception paths, and transmit a combined signal to a digital unit (DU) through the combined paths, the combined signal being generated as a result of combining the signals received through the plurality of reception paths according to the determined combined weight.

Advantageous Effects of Disclosure

According to embodiments described herein, reception paths are combined through a combined weight in a multiple antenna communication system having a large number of reception paths of a radio unit, such that the amount of information transmitted from the radio unit to a digital unit may be reduced.

BRIEF DESCRIPTION OF DRAWINGS

FIG. 5 is a diagram for describing a combined weight generated by an RU, according to an embodiment.

FIG. 6 is a diagram for describing a method, performed by an RU, of generating a combined weight based on channel information that is a 4×32 matrix, according to an embodiment.

BEST MODE

Figure 1:
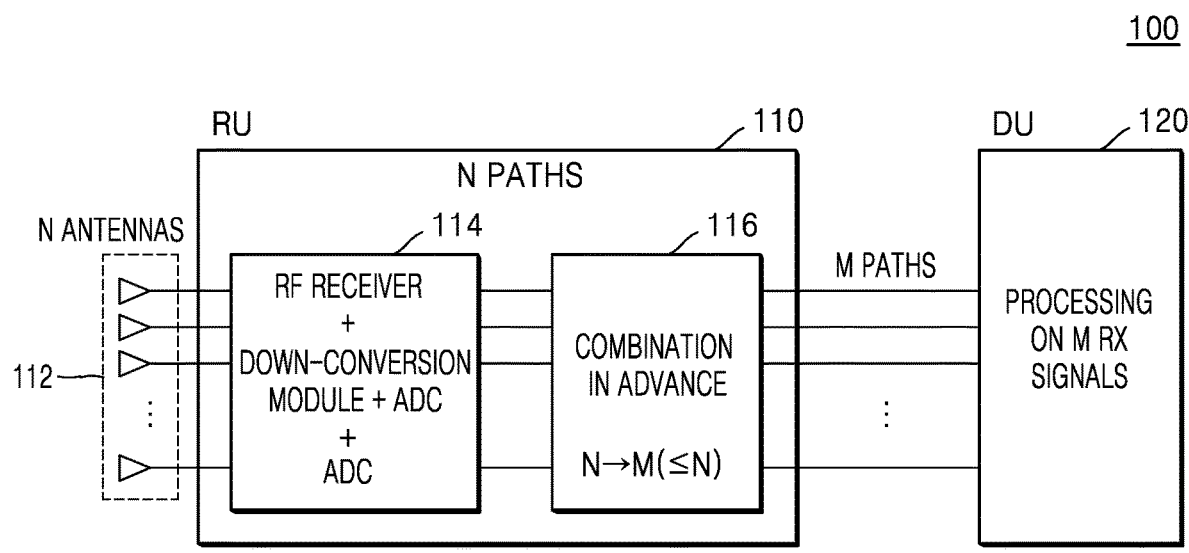
FIG. 1 is a conceptual diagram for describing a method, performed by a radio unit (RU), of transmitting a signal to a digital unit (DU) through a combined path, according to an embodiment.

According to an embodiment of the present disclosure, a method, performed by a radio unit (RU), of transmitting and receiving a signal in a wireless communication system includes: obtaining channel information about a plurality of reception paths of the RU, through which signals of at least one user equipment (UE) are received, with respect to each UE; determining a combined weight based on the channel information by using preset mapping information according to the number of the plurality of reception paths and the number of combined paths that are combined from the plurality of reception paths; and transmitting a combined signal to a digital unit (DU) through the combined paths, the combined signal being generated as a result of combining the signals received through the plurality of reception paths according to the determined combined weight.

In the method according to the embodiment, when the number of the plurality of reception paths is N and the number of the combined paths is M, the combined weight may be a matrix including M×N combined weight vectors.

In the method according to the embodiment, the determining of the combined weight may include mapping a channel vector constituting channel information about a plurality of reception paths to M×N combined weight vectors by using the preset mapping information.

In the method according to the embodiment, the obtaining of the channel information may include obtaining the channel information based on a random access signal transmitted by the at least one UE when the at least one UE connects to the RU for an initial call.

In the method according to the embodiment, the obtaining of the channel information may include obtaining the channel information by periodically receiving a sounding reference signal (SRS) from the at least one UE.

In the method according to the embodiment, the obtaining of the channel information may include obtaining the channel information through a demodulation reference signal (DMRS) received through a data channel between the at least one UE and the RU.

The method according to the embodiment may further include obtaining, through a physical uplink shared channel (PUSCH), information about the number of allocated layers between the at least one UE and the RU and information about UEs allocated to a specific layer, and the obtaining of the channel information may include obtaining channel information about a plurality of reception paths for each UE based on the information about the number of allocated layers and the information about the UEs allocated to the specific layer.

The method according to the embodiment may further include obtaining information about the number of UEs allocated per resource block (RB) through a physical uplink shared channel (PUSCH).

In the method according to the embodiment, the determining of the combined weight may include, when UEs scheduled for each RB in a frequency domain are different, determining the combined weight based on channel information obtained in each RB in the frequency domain.

According to an embodiment, a radio unit (RU) for transmitting and receiving a signal in a wireless communication system includes: at least one processor configured to obtain channel information about a plurality of reception paths of the RU, through which signals of at least one user equipment (UE) are received, with respect to each UE, and determine a combined weight based on the channel information by using preset mapping information according to the number of the plurality of reception paths and the number of combined paths that are combined from the plurality of reception paths; a transceiver configured to transmit a combined signal to a digital unit (DU) through the combined paths, the combined signal being generated as a result of combining the signals received through the plurality of reception paths according to the determined combined weight; and a memory configured to store the preset mapping information.

MODE OF DISCLOSURE

Hereinafter, technology for a terminal to receive broadcast information from a base station in a wireless communication system will be described. The present disclosure relates to a communication technique for converging, with an Internet of Things (IoT) technology, a $5^{th}$ Generation (5G) communication system for supporting a data transmission rate higher than that of a $4^{th}$ Generation (4G) system or a beyond 4G system, and a system therefor. The present disclosure may be applied to intelligent services based on 5G communication technology and IoT-related technology (e.g., smart homes, smart buildings, smart cities, smart cars or connected cars, health care, digital education, retail, security and safety related services, etc.).

For convenience of description, some terms and names defined in the 3rd Generation Partnership Project Long-Term Evolution (3GPP LTE) standard may be used. However, the present disclosure is not limited by the terms and names and may be equally applied to systems conforming to other standards.

A wireless communication system has evolved from a system providing a voice-oriented service to a broadband wireless communication system providing high-speed high quality packet data services of communication standards such as High Speed Packet Access (HSPA) of 3GPP, LTE or Evolved Universal Terrestrial Radio Access (E-UTRA), LTE-A, LTE-Pro, High Rate Packet Data (HRPD) of 3GPP2, Ultra Mobile Broadband (UMB), and IEEE 802.16e.

As a representative example of the broadband wireless communication system, the LTE system employs an Orthogonal Frequency Division Multiplexing (OFDM) scheme in a downlink (DL) and employs a Single Carrier Frequency Division Multiple Access (SC-FDMA) scheme in an uplink (UL). The UL refers to a radio link through which a terminal (user equipment (UE) or mobile station (MS)) transmits data or a control signal to a base station (eNode B or BS), and the DL refers to a radio link through which a BS transmits data or a control signal to a UE. In the multiple access scheme as described above, data or control information for each user may be distinguished by performing allocation and operation so that time-frequency resources for carrying data or control information for each user do not overlap each other, that is, orthogonality is established.

Future communication systems after LTE, that is, 5G communication systems (or New Radio (NR)) have to be able to freely reflect various requirements of users and service providers. Therefore, services that satisfy various requirements at the same time have to be supported. Services considered for 5G communication systems include enhanced Mobile Broadband (eMBB), massive machine Type Communication (MMTC), and Ultra Reliability Low Latency Communication (URLLC).

Hereinafter, embodiments of the present disclosure, which are applicable to the above-described communication systems, will be described in detail with reference to the accompanying drawings.

FIG. 1 is a conceptual diagram for describing a method, performed by a radio unit (RU), of transmitting a signal to a digital unit (DU) through a combined path, according to an embodiment.

In general, a BS may largely include an RU and a DU. The DU may include a digital device that processes a baseband signal, and the RU may include an analog device that processes an analog radio signal.

An RU and a DU may be present in one cell site. However, in a structure such as a centralized/cloud radio access network (C-RAN), an RU and a DU may be separated, only the RU is left in a cell site in which an actual radio signal is transmitted and received, and the DU present in each cell site may be managed in a centralized manner. The RU and the DU provided at different places may be connected to each other via an optical cable.

When the RU and the DU are provided at different places, an RU-DU interface for transmitting and receiving information between the RU and the DU may be present. A signal that the RU receives from at least one UE through the RU-DU interface may be transmitted to the DU. When there are a plurality of reception paths for a radio signal received from the UE, the amount of information to be transmitted through the RU-DU interface may increase. In this case, as a bandwidth (BW) required between the RU and the DU increases, a front haul construction cost may increase. The reception path indicates a path through which a signal is transmitted in an UL between at least one UE and the RU.

In a wireless communication system 100 according to an embodiment, as in massive multiple input multiple out (MIMO), when an RU 110 having a plurality of reception paths transmits a signal to a DU 120, the reception paths are combined to reduce the amount of information of a signal transmitted from the RU 110 to the DU 120.

Referring to FIG. 1, a signal that the RU 110 receives from at least one UE through N antennas 112 may pass through at least one module 114 including a radio frequency (RF) receiver (a filter or a low noise amplifier (LNA)), a down conversion module, and an analog-to-digital converter (ADC). The signal received from the at least one UE through the at least one module 114 may be subjected to the operation of the RF receiver, down-converted into a base band, and then converted into a digital signal. However, the at least one module 114 illustrated in FIG. 1 is only an example, and other types of modules that perform the above-described operations may be included in the RU 110.

In order to reduce the amount of information of the signal converted through the at least one module 114, the RU 110 may determine a combined weight for combining the reception paths based on channel information about the reception paths. For example, in order to combine N reception paths, which are paths through which signals are received from the at least one UE, into M paths, the RU 110 may determine an M×N matrix including a combined weight vector based on channel information about a plurality of reception paths for each UE. In the present disclosure, the method of determining the combined weight will be described below in more detail with reference to FIGS. 3 to 7.

The RU 110 may generate a combined signal by combining signals received from the at least one UE through the N reception paths according to the combined weight. The RU 110 may transmit the generated combined signal to the DU 120 through the M combined paths.

The DU 120 may recover data through digital signal processing from the signals received through the M combined paths.

Figure 2:
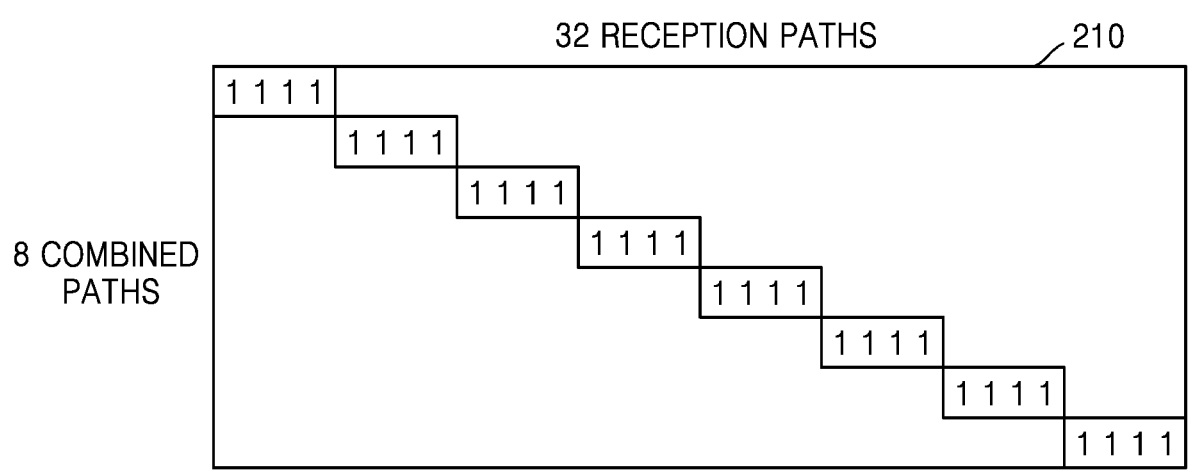
FIG. 2 is a diagram for describing a combined signal when a weight is determined regardless of channel characteristics of a reception path in an RU.

FIG. 2 is a diagram for describing a combined signal when a weight is determined regardless of channel characteristics of a reception path in an RU.

Referring to FIG. 2, the RU may determine a combined weight 210 for combining reception paths regardless of channel characteristics of the reception paths. For example, the RU may use the combined weight 210, which is an 8×32 matrix, so as to generate 8 combined paths from 32 reception paths. Also, it is assumed that the RU determines [1, 1, 1, 1] as the combined weight vector for the reception paths grouped by four in the 8×32 matrix. In the 8×32 matrix, 0 may be applied to a part not specified as 1.

When the RU combines the reception paths regardless of the channel characteristics of the reception paths, the amount of information obtained by the DU may be lost. For example, when instantaneous channel characteristics of the reception paths of the RU are [1, −1, 1, −1], the components of the combined path may be canceled according to Equation 1 below.

$$[1,-1,1,-1] \times [1,1,1,1]^T = O \qquad \text{Equation 1}$$

As in the above-described example, when the components of the combined path are canceled, it may be difficult to recover the signals in the DU. Therefore, it is necessary to determine a combined weight that is capable of preventing loss of signals while reducing a BW between the RU and DU.

In the wireless communication system according to the embodiment, the RU determines the combined weight considering channel characteristics of the reception paths, thereby reducing loss of signals transmitted from the RU to the DU. Details thereof will be described below with reference to FIGS. 3 to 7.

Figure 3:
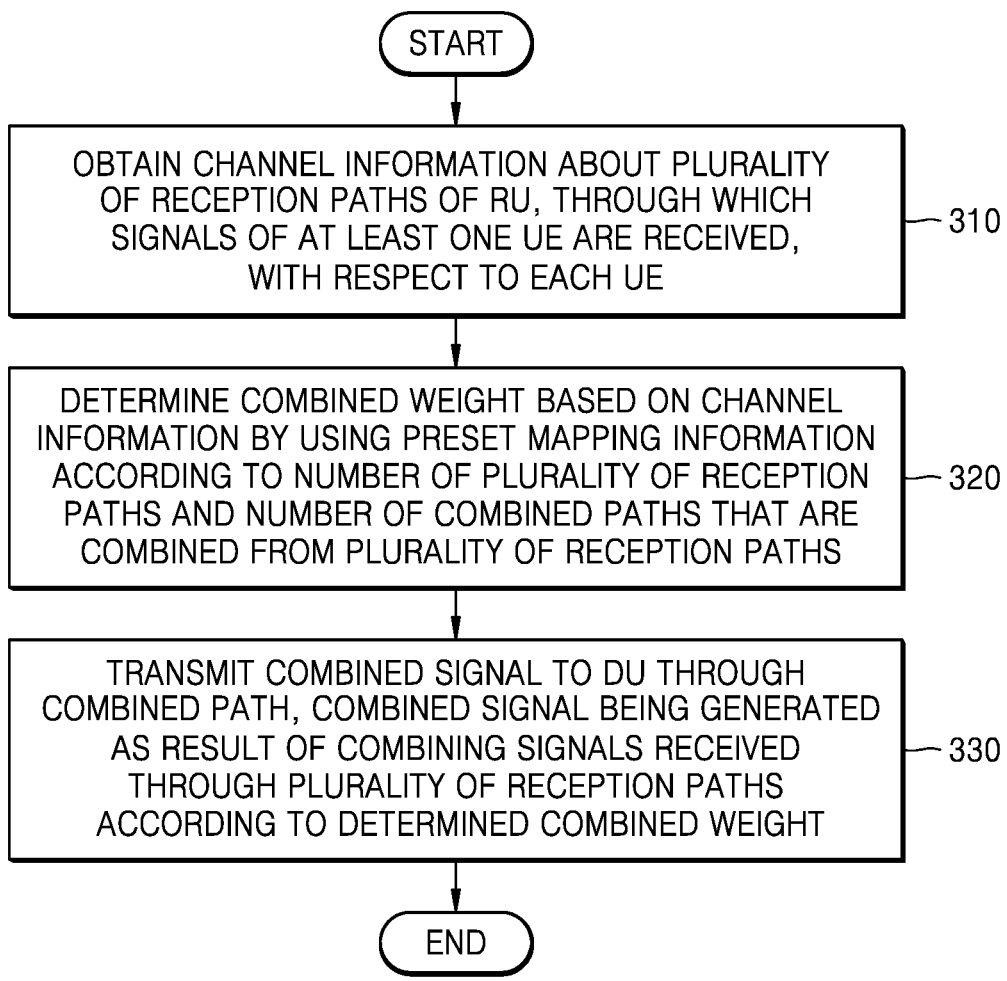
FIG. 3 is a flowchart of a method, performed by an RU, of transmitting and receiving a signal, according to an embodiment.

FIG. 3 is a flowchart of a method, performed by the RU, of transmitting and receiving a signal, according to an embodiment.

In operation 310, the RU may obtain channel information about a plurality of reception paths, through which signals of at least one UE are received, with respect to each UE.

The RU according to the embodiment may obtain channel information based on a random access signal transmitted when at least one UE connects to the RU for an initial call. For example, the RU may obtain channel information from a signal received through a physical random access channel (PRACH).

According to another embodiment, the RU may obtain channel information based on a sounding reference signal (SRS) periodically received from the at least one UE. According to another embodiment, the RU may obtain channel information through a demodulation reference signal (DMRS) received through a data channel between the at least one UE and the RU.

The RU may obtain channel information for each UE considering the number of layers allocated for each UE. For example, the RU may obtain information about the number of allocated layers between the at least one UE and the RU and information about UEs allocated to a specific layer through a physical uplink shared channel (PUSCH). According to another example, the RU may obtain information about the number of UEs allocated per resource block (RB) through a physical uplink control channel (PUCCH). In particular, when UEs scheduled for each RB of a frequency domain are different as in the OFDM system, the number of UEs allocated for each RB may be different. Therefore, the RU may determine the number of UEs allocated for each RB through the PUCCH.

In operation 320, the RU may determine a combined weight based on channel information by using preset mapping information according to the number of reception paths and the number of combined paths that are combined from the reception paths.

For example, when the number of reception paths between the at least one UE and the RU is N and the number of combined paths between the RU and the DU is M, a matrix including an M×N combined weight vector may be required as the combined weight so as to generate M combined paths from N reception paths. The RU may map each channel vector constituting channel information about a plurality of reception paths to M×N combined weight vectors by using the preset mapping information. The mapping information may include an index of the channel vector, an index of the weight vector, and a value (e.g., 0 or 1) applied to the channel vector, but this is only an example. The mapping information is not limited to the above-described example.

Because the number of UEs simultaneously allocated to the RB is different for each RB, mapping information may be configured differently according to the RB.

In operation 330, the RU may transmit a combined signal to the DU through the combined path, the combined signal being generated as a result of combining the signals received through the reception paths according to the determined combined weight.

The RU according to the embodiment may generate the combined signal by applying the combined weight to the signals obtained through the reception paths. The RU may effectively reduce the BW required between the RU and the DU by combining the reception paths by using the combined weight generated considering the channel characteristics.

The DU may recover data through digital signal processing from the signals received through the M combined paths.

Figure 4:
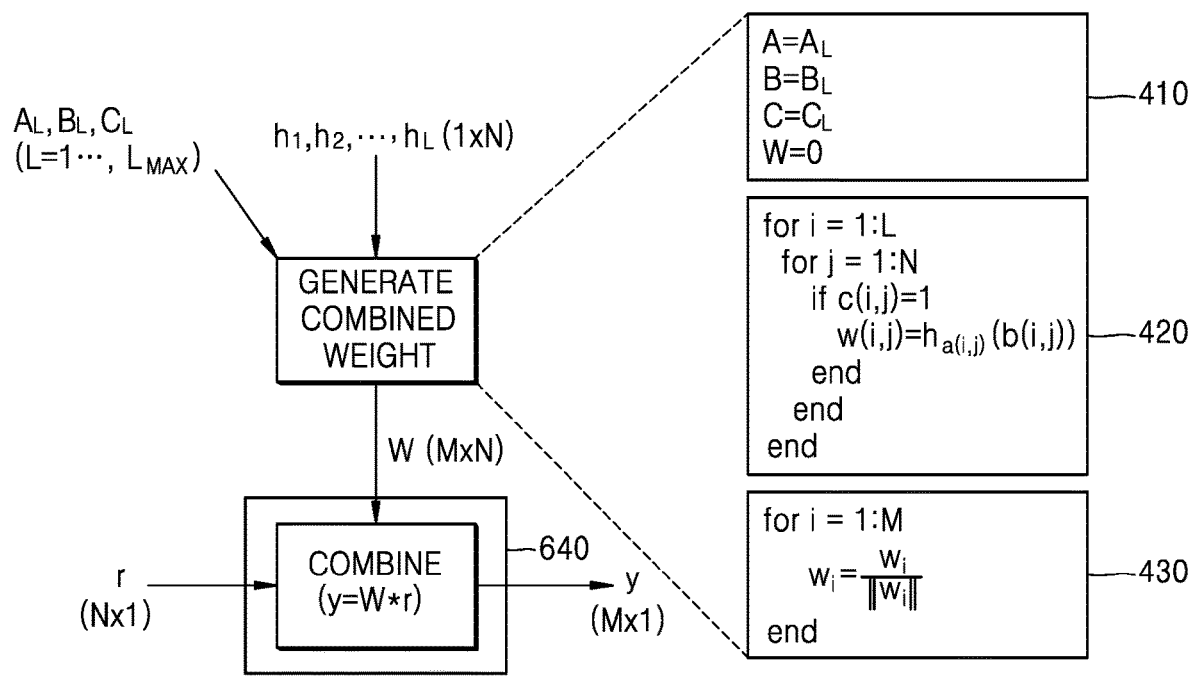
FIG. 4 is a diagram for describing a method, performed by an RU, of determining a combined weight, according to an embodiment.

FIG. 4 is a diagram for describing a method, performed by the RU, of determining a combined weight, according to an embodiment.

Referring to FIG. 4, the RU may obtain channel information about a plurality of reception paths, through which signals of at least one UE are received, with respect to each UE. When the UE includes one antenna and the RU includes N antennas, channel information for the UE may be represented by a 1×N matrix.

Also, the RU may obtain pieces of channel information as many as the number of UEs simultaneously allocated to the RB. For example, when the number of simultaneously allocated UEs is L, the RU may obtain h1, h2, . . . , hL, which are vectors having L 1×N components. This is only an example of a case in which a signal is transmitted to one layer per UE. When a signal is transmitted to two layers per UE, a vector having L/2 2×N components may be obtained. It is assumed that L is less than or equal to M, which is the number of combined paths.

The RU may obtain preset mapping information according to the number N of reception paths and the number M of combined paths. According to block 410, the RU may obtain $A_L$, $B_L$, and $C_L$, which are indices for specifying the UE, from the preset mapping information and substitute $A_L$, $B_L$, and $C_L$ into A, B, and C, respectively. a(i, j), which is a component of a matrix A into which $A_L$ is substituted, may have a value from 1 to L. b(i, j), which is a component of a matrix B into which $B_L$ is substituted, may have a value from 1 to N. c(i, j), which is a component of a matrix C into which $C_L$ is substituted, may have 0 or 1. Also, an initial combined weight W may be set to zero.

According to block 420, the RU may use the above-described indices to determine, as a component of a combined weight matrix W, a channel value or 0 with respect to a reception path for each UE during L×N times. According to the preset value of c(i, j), when the component of c(i, j) is 0, the component of the combined weight matrix W may be determined to be 0, and when the component of c(i, j) is 1, the channel value may be substituted as the component of the combined weight matrix W.

According to block 430, the RU may normalize the magnitude of the combined weight so as to maintain signal strength in the combined path.

According to block 440, the RU may combine a signal r received through a plurality of reception paths according to the combined weight matrix W finally obtained as a result of the normalizing. The RU may transmit a combined signal y obtained as a result of the combining to the DU through M combined paths.

FIG. 5 is a diagram for describing a combined weight generated by the RU, according to an embodiment.

Referring to FIG. 5, the RU may determine an N×M combined weight matrix W so as to derive M combined paths from N reception paths. In the present embodiment, it is assumed that the number of UEs simultaneously allocated to the RB is L and a vector h representing channel information for each UE includes 1×N components.

The RU may apply channel information for each UE as each component of the combined weight matrix according to preset mapping information. For example, group 1 410 to which channel information of UE 1 is mapped in the combined weight matrix W may include h'(1, 1), h'(1, 2), h'(1, m(1)), and 0. h'(1, 1), h'(1, 2), and h'(1, m(1)) may be determined from at least some components of a matrix representing the channel information about UE 1. Also, in order to maintain signal strength in the combined path, the RU may perform normalization after mapping at least some components of the vector indicating the channel information about UE 1 to components of the combined weight matrix W.

Also, as described above, the combined weight matrix W may further include groups 2 to group L 420 to which channel information about UE 2 to UE L is mapped.

The RU according to the embodiment may use the generated M×N combined weight matrix to combine the signals received through the N reception paths so as to be transmitted through the M combined paths.

FIG. 6 is a diagram for describing a method, performed by the RU, of generating a combined weight based on channel information that is a 4×32 matrix, according to an embodiment.

In FIG. 6, an example of generating the combined weight matrix by using the mapping information described above with reference to FIG. 4 will be described.

In the present embodiment, when a signal is transmitted to the RU through one layer per UE, a 4×32 matrix indicating channel information about four UEs may be obtained. In the present embodiment, it is assumed that the number of antennas of the RU is 32 and the number of combined paths indicating the paths between the RU and the DU is 8.

In order to combine the reception paths, the RU according to the embodiment may determine an 8×32 combined weight matrix 610 based on a 4×32 channel matrix indicating channel information. In the combined weight matrix 610, h'(i) may be a vector including the first 16 components of a channel vector h(i) of an i-th layer, and h"(i) may be a vector including the remaining 16 components of the channel vector h(i) of the i-th layer. Also, in the combined weight matrix 610, 0 may be a 16×1 zero vector.

When UEs scheduled for each RB in a frequency domain are different as in the OFDM system, the above-described process may be performed for each RB. To this end, the RU may perform a fast Fourier transform (FFT) on a received signal before performing the combination.

Figure 7:
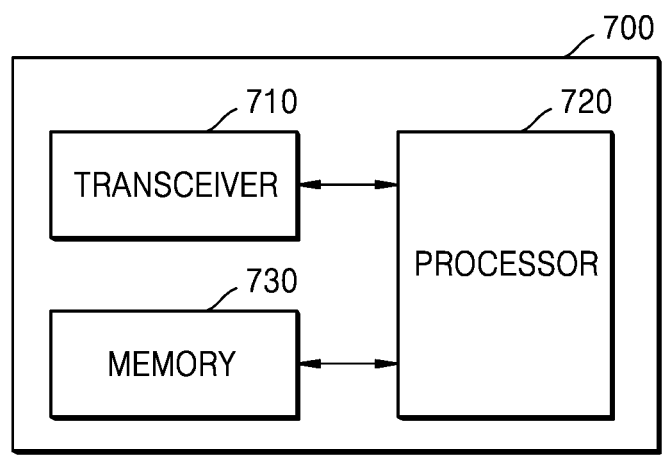
FIG. 7 is a block diagram of an RU according to an embodiment.

FIG. 7 is a block diagram of an RU 700 according to an embodiment.

Referring to FIG. 7, the RU 700 may include a transceiver 710, a processor 720, and a memory 730. The transceiver 710, the processor 720 and the memory 730 may operate according to the bandwidth adjustment method of the BS proposed in the above-described embodiments. However, the elements of the RU 700 according to the embodiment are not limited to the above-described example. According to another embodiment, the RU 700 may include more elements or fewer elements than the above-described elements. In a particular case, the transceiver 710, the processor 720, and the memory 730 may be implemented in the form of a single chip.

The transceiver 710 may transmit and receive a signal with a UE or a DU. The signal may include control information and data. To this end, the transceiver 710 may include an RF transmitter that performs up-conversion and amplification on a frequency of a signal to be transmitted, and an RF receiver that performs low-noise amplification on a received signal and performs down-conversion on a frequency of the received signal. However, this is merely an embodiment, and the elements of the transceiver 710 are not limited to the RF transmitter and the RF receiver.

Also, the transceiver 710 may receive a signal through a radio channel, output the received signal to the processor 720, and transmit an output signal of the processor 720 through the radio channel. For example, the transceiver 710 may transmit signals received from at least one UE through N reception paths by using M combined paths.

The processor 720 may control a series of processes so that the RU 700 operates according to the above-described embodiments of the present disclosure. For example, the processor 720 may perform at least one signal transmission and reception method according to the above-described embodiments.

For example, the processor 720 may obtain channel information about a plurality of reception paths of the RU, through which signals of at least one UE are received, with respect to each UE. Also, the processor 720 may determine a combined weight based on channel information by using preset mapping information according to the number of reception paths and the number of combined paths that are combined from the reception paths.

For example, the processor 720 may map a channel vector constituting channel information about a plurality of reception paths to M×N combined weight vectors by using the preset mapping information.

The processor 720 may obtain channel information based on a random access signal transmitted when at least one UE connects to the RU for an initial call. According to another embodiment, the processor 720 may obtain channel information by periodically receiving an SRS from the at least one UE. According to another embodiment, the processor 720 may obtain channel information through a DMRS received through a data channel between the at least one UE and the RU.

Also, the processor 720 may obtain information about the number of allocated layers between the at least one UE and the RU and information about UEs allocated to a specific layer through a PUSCH. The processor 720 may obtain channel information about a plurality of reception paths for each UE based on the information about the number of allocated layers and the information about the UEs allocated to the specific layer. However, this is only an example, and the processor 720 may obtain information about the number of UEs allocated per RB through the PUCCH.

When UEs scheduled for each RB in the frequency domain are different, the processor 720 according to the embodiment may determine a combined weight based on channel information obtained in each RB in the frequency domain.

The memory 730 may store control information or data included in the signal obtained by the RU 700 and may have an area for storing data necessary for the control of the processor 720, data generated during the control of the processor 720, and the like. For example, the memory 730 may store preset mapping information for determining the combined weight. Also, according to another embodiment, the memory 730 may store information about the determined combined weight.

The memory 730 may be configured in various forms, such as read-only memory (ROM), random access memory (RAM), hard disk, compact disc read-only memory (CD-ROM), and/or digital versatile disc (DVD).

The embodiments of the present disclosure, which are described in the specification and drawings, are merely presented as specific examples so as to easily explain the technical contents of the present disclosure and help the understanding of the present disclosure and are not intended to limit the scope of the present disclosure.

That is, it will be obvious to those of ordinary skill in the art that other modifications based on the technical idea of the present disclosure may be made. Also, the embodiments are divided for convenience of description and may be combined and operated as necessary. For example, part of embodiments 1, 2, 3, and 4 of the present disclosure may be combined with each other so that the BS and the UE operate.

The device according to the embodiments may include a processor, a memory configured to store and execute program data, a permanent storage such as a disk drive, a communication port configured to communicate with an external device, and user interface devices such as a touch panel, keys, or buttons. The methods implemented by software modules or algorithms may be stored on a computer-readable recording medium as computer-readable code or program commands executable on the processor. Examples of the computer-readable recording medium may include magnetic storage media (e.g., ROM, RAM, floppy disk, hard disk, etc.) and optical readable media (e.g., CD-ROM, DVD, etc.). The computer-readable recording medium may also be distributed over network-coupled computer systems so that the computer-readable code is stored and executed in a distributed fashion. The media may be read by the computer, be stored in the memory, and be executed by the processor.

The embodiments of the present disclosure may be represented by functional block configurations and various processing operations. All or part of such functional blocks may be realized by any number of hardware components and/or software components configured to perform particular functions. For example, the embodiments described herein may employ various integrated circuit components, such as memories, processing, logics, look-up tables, and the like, which may carry out a variety of functions under the control of one or more microprocessors or other control devices. Similar to the elements of the embodiments that may be carried out by using software programming or software elements, the embodiments described herein may be implemented by any programming or scripting language such as C, C++, Java, assembler, or the like, including various algorithms that are implemented by any combination of data structures, objects, processes, routines or other programming elements. Functional aspects may be implemented by algorithms that are executed on one or more processors. Also, the embodiments described herein may employ any conventional techniques for electronic environment configuration, signal processing, and/or data processing.

The invention claimed is:

1. A method, performed by a radio unit (RU), of transmitting and receiving a signal in a wireless communication system, the method comprising:
   receiving, via a plurality of reception paths, signals from at least one user equipment (UE);
   obtaining, through a physical uplink shared channel (PUSCH), information about a number of allocated layers between the at least one UE and the RU and information about UEs allocated to a specific layer;
   obtaining channel information about the plurality of reception paths of the RU, through which the signals of the at least one UE are received, based on the information about the number of allocated layers and the information about the UEs allocated to the specific layer, with respect to each UE;
   determining a combined weight based on the channel information by using preset mapping information according to a number of the plurality of reception paths and a number of combined paths that are combined from the plurality of reception paths; and
   transmitting a combined signal to a digital unit (DU) through the combined paths, the combined signal being generated as a result of combining the signals received through the plurality of reception paths according to the determined combined weight,
   wherein the DU is a standalone device separate from the RU and the at least one UE.

2. The method of claim 1, wherein, when the number of the plurality of reception paths is N and the number of the combined paths is M, the combined weight is a matrix including MxN combined weight vectors.

3. The method of claim 1, wherein the obtaining of the channel information comprises obtaining the channel information based on a random access signal transmitted by the at least one UE when the at least one UE connects to the RU for an initial call.

4. The method of claim 1, wherein the obtaining of the channel information comprises obtaining the channel information by periodically receiving a sounding reference signal (SRS) from the at least one UE.

5. The method of claim 1, wherein the obtaining of the channel information comprises obtaining the channel information through a demodulation reference signal (DMRS) received through a data channel between the at least one UE and the RU.

6. The method of claim 1, wherein the determining of the combined weight comprises, when UEs scheduled for each resource block (RB) in a frequency domain are different, determining the combined weight based on channel information obtained in each RB in the frequency domain.

7. A radio unit (RU) for transmitting and receiving a signal in a wireless communication system, the RU comprising:
   at least one processor configured to:
      receive, via a plurality of reception paths, signals from at least one user equipment (UE),
      obtain, through a physical uplink shared channel (PUSCH), information about a number of allocated layers between the at least one UE and the RU and information about UEs allocated to a specific layer,
      obtain channel information about a plurality of reception paths of the RU, through which signals of the at least one UE are received, based on the information about the number of allocated layers and the information about the UEs allocated to the specific layer, with respect to each UE, and
      determine a combined weight based on the channel information by using preset mapping information according to a number of the plurality of reception paths and a number of combined paths that are combined from the plurality of reception paths;
   a transceiver configured to transmit a combined signal to a digital unit (DU) through the combined paths, the combined signal being generated as a result of combining the signals received through the plurality of reception paths according to the determined combined weight; and
   a memory configured to store the preset mapping information,
   wherein the DU is a standalone device separate from the RU and the at least one UE.

8. The RU of claim 7, wherein, when the number of the plurality of reception paths is N and the number of the combined paths is M, the combined weight is a matrix including MxN combined weight vectors.

9. The RU of claim 7, wherein the at least one processor is further configured to obtain the channel information based on a random access signal transmitted by the at least one UE when the at least one UE connects to the RU for an initial call.

10. The RU of claim 7, wherein the at least one processor is further configured to obtain the channel information by periodically receiving a sounding reference signal (SRS) from the at least one UE.

11. The RU of claim 7, wherein the at least one processor is further configured to obtain the channel information through a demodulation reference signal (DMRS) received through a data channel between the at least one UE and the RU.

12. The RU of claim 7, wherein the at least one processor is further configured to, when UEs scheduled for each resource block (RB) in a frequency domain are different, determine the combined weight based on channel information obtained in each RB in the frequency domain.

13. A non-transitory computer-readable recording medium having recorded thereon a program that, when executed by at least one processor, cause the at least one processor to perform a method comprising:
- receiving, via a plurality of reception paths, signals from at least one user equipment (UE);
- obtaining, through a physical uplink shared channel (PUSCH), information about a number of allocated layers between the at least one UE and a radio unit (RU) and information about Ues allocated to a specific layer;
- obtaining channel information about the plurality of reception paths of the RU, through which the signals of the at least one UE are received, based on the information about the number of allocated layers and the information about the Ues allocated to the specific layer, with respect to each UE;
- determining a combined weight based on the channel information by using preset mapping information according to a number of the plurality of reception paths and a number of combined paths that are combined from the plurality of reception paths; and
- transmitting a combined signal to a digital unit (DU) through the combined paths, the combined signal being generated as a result of combining the signals received through the plurality of reception paths according to the determined combined weight,
- wherein the DU is a standalone device separate from the RU and the at least one UE.

* * * * *